(12) United States Patent
Morikawa et al.

(10) Patent No.: US 10,113,756 B2
(45) Date of Patent: Oct. 30, 2018

(54) AIR-CONDITIONING-APPARATUS OUTDOOR UNIT AND METHOD OF MANUFACTURING AIR-CONDITIONING-APPARATUS OUTDOOR UNIT

(71) Applicant: Mitsubishi Electric Corporation, Tokyo (JP)

(72) Inventors: Yuudai Morikawa, Tokyo (JP); Tomoki Inagaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 271 days.

(21) Appl. No.: 14/785,981

(22) PCT Filed: Jun. 14, 2013

(86) PCT No.: PCT/JP2013/066477
§ 371 (c)(1),
(2) Date: Oct. 21, 2015

(87) PCT Pub. No.: WO2014/199515
PCT Pub. Date: Dec. 18, 2014

(65) Prior Publication Data
US 2016/0146476 A1 May 26, 2016

(51) Int. Cl.
*F28F 9/00* (2006.01)
*F28D 1/00* (2006.01)
(Continued)

(52) U.S. Cl.
CPC .............. *F24F 1/56* (2013.01); *B23P 15/26* (2013.01); *F24F 1/16* (2013.01); *F24F 13/30* (2013.01);
(Continued)

(58) Field of Classification Search
CPC ........ F28F 9/013; F28F 9/0131; F28F 9/0132; F28F 9/0135; F28F 9/007; F28F 2280/06;
(Continued)

(56) References Cited

U.S. PATENT DOCUMENTS 6,907,916 B2 * 6/2005 Koyama ............... F28D 1/0443
165/140
7,178,579 B2 * 2/2007 Kolb .................... F02B 29/0412
123/563
(Continued)

FOREIGN PATENT DOCUMENTS

JP     S48-052338 U        7/1973
JP     58021792 U    *     2/1983
(Continued)

OTHER PUBLICATIONS

Extended European Search Report dated Feb. 23, 2017 in corresponding European Patent Application No. 13886978.9.
(Continued)

*Primary Examiner* — Frantz Jules
*Assistant Examiner* — Jason Thompson
(74) *Attorney, Agent, or Firm* — Posz Law Group, PLC (57) ABSTRACT

An outdoor unit includes: a lower heat exchanger having a first heat-transfer tube; an upper heat exchanger provided above the lower heat exchanger, including a first-row heat-exchanger core and a second-row heat-exchanger core, and a second heat-transfer tube; and a reinforcing member supporting the upper heat exchanger, wherein the reinforcing member includes a first supporting tab supporting the bottom of the second-row heat-exchanger core; a second supporting tab supporting the lower side surface of the second-row heat-exchanger core and formed integrally with the first supporting tab; a third supporting tab providing a gap between the first-row heat-exchanger core and the
(Continued)

second-row heat-exchanger core and formed integrally with the first supporting tab; an engaging tab holding the first heat-transfer tubes and formed integrally with the third supporting tab; and an engaging tab holding the second heat-transfer tubes and formed integrally with the third supporting tab.

9 Claims, 6 Drawing Sheets

(51) Int. Cl.
| | |
|---|---|
| *F28F 9/04* | (2006.01) |
| *F24F 1/56* | (2011.01) |
| *F24F 1/16* | (2011.01) |
| *B23P 15/26* | (2006.01) |
| *F24F 13/30* | (2006.01) |
| *F28D 1/04* | (2006.01) |
| *F28F 9/013* | (2006.01) |
| *F28D 1/047* | (2006.01) |
| *F24F 13/22* | (2006.01) |

(52) U.S. Cl.
CPC ......... *F28D 1/0426* (2013.01); *F28D 1/0477* (2013.01); *F28F 9/0131* (2013.01); *F28F 9/0132* (2013.01); *F24F 2013/221* (2013.01)

(58) Field of Classification Search
CPC ... F28F 2009/004; F28F 9/002; F28D 1/0426; F28D 1/0452; F28D 1/0443; F28D 1/0435; F24F 13/32; F24F 1/56; F24F 1/16; F24F 13/30; B23P 15/26
USPC .................................................. 165/67, 149
See application file for complete search history.

(56) References Cited

U.S. PATENT DOCUMENTS

| | | | | |
|---|---|---|---|---|
| 7,284,594 | B2* | 10/2007 | Sanada | ................... F25B 39/04 |
| | | | | 165/132 |
| 2001/0040021 | A1* | 11/2001 | Avequin | ................ F28D 1/0435 |
| | | | | 165/67 |
| 2009/0025915 | A1* | 1/2009 | Qvist | .................... F28D 7/1653 |
| | | | | 165/149 |
| 2010/0276131 | A1* | 11/2010 | Barwig | ............... F02B 29/0462 |
| | | | | 165/162 |
| 2013/0037239 | A1* | 2/2013 | Shiborino | ................ F24F 1/16 |
| | | | | 165/67 |

FOREIGN PATENT DOCUMENTS

| | | | |
|---|---|---|---|
| JP | S58-021792 U | | 2/1983 |
| JP | 60-202282 A | | 10/1985 |
| JP | 04-353331 A | | 12/1992 |
| JP | 07-041327 A | | 2/1995 |
| JP | 09-145095 A | | 6/1997 |
| JP | 2007-010269 A | | 1/2007 |
| JP | 2009-079851 A | | 4/2009 |
| JP | 2009-079853 A | | 4/2009 |
| JP | 2009079853 A | * | 4/2009 |
| JP | 2012-225563 A | | 11/2012 |

OTHER PUBLICATIONS

Office Action dated Jun. 2, 2017 for the corresponding CN patent application No. 201380077402.5 (english translation).
International Search Report of the International Searching Authority dated Aug. 13, 2013 for the corresponding international application No. PCT/JP2013/066477 (and English translation).

* cited by examiner

AIR-CONDITIONING-APPARATUS OUTDOOR UNIT AND METHOD OF MANUFACTURING AIR-CONDITIONING-APPARATUS OUTDOOR UNIT

CROSS REFERENCE TO RELATED APPLICATION

This application is a U.S. national stage application of International Application No. PCT/JP2013/066477 filed on Jun. 14, 2013, the disclosure of which is incorporated herein by reference.

TECHNICAL FIELD

The present invention relates to an outdoor unit for an air-conditioning-apparatus and a method of manufacturing the outdoor unit for an air-conditioning-apparatus.

BACKGROUND ART

Air-conditioning-apparatus outdoor units that are installed in buildings, commercial facilities, or the like these days have a heat exchanger that is disposed along a rear surface and side surfaces and a fan that is disposed on a top surface. By driving the fan, a negative pressure is formed inside, a flow of air is produced around the heat exchanger, and then heat exchange using the heat exchanger is performed.

The heat exchanger is formed such that heat-transfer tubes perpendicularly penetrate through fins. The heat-transfer tubes are, for example, circular pipes, and the fins radiate heat conducted from the circular pipes due to refrigerant moving through the circular pipes. The heat-transfer tubes may alternatively be, for example, flat pipes.

The above-described heat exchanger includes a plurality of heat exchangers that are stacked on top of one another, and, for example, an upper heat exchanger has a larger number of rows of heat-transfer tubes. Such an upper heat exchanger is hung by a separate member or provided with a support plate therebelow, thereby being securely supported so as not to fall down (see, for example, Patent Literature 1).

Furthermore, such a heat exchanger is provided with a bottom plate for supporting a bottom of a lower heat exchanger. Because the bottom plate collects dew condensation water produced by the heat exchanger, it causes freezing or corrosion.

To counter this situation, for example, in a conventional outdoor unit, a plurality of drain ports are provided in the bottom plate to discharge the dew condensation water produced by the heat exchanger from the drain ports (see, for example, Patent Literature 2).

Furthermore, for example, in a conventional outdoor unit, by configuring such that the bottom plate is sloped and is provided with drain holes on the downstream side of the slope, the dew condensation water produced by the heat exchanger is discharged from the drain holes through the use of the slope (see, for example, Patent Literature 3).

Furthermore, for example, in a conventional outdoor unit, by providing a plurality of louver-like cut-and-raised portions in the bottom plate, at a position corresponding to the heat exchanger, the strength of the bottom plate is maintained, while improving the efficiency of discharging the dew condensation water produced by the heat exchanger (for example, Patent Literature 4).

Furthermore, for example, in a conventional outdoor unit, by disposing a heat pipe at the lowest position of the heat exchanger, the dew condensation water produced by the heat exchanger is heated, whereby freezing of the dew condensation water is avoided (for example, see Patent Literature 5).

CITATION LIST

Patent Literature

Patent Literature 1: Japanese Unexamined Patent Application Publication No. 2009-79851 (paragraph [0049])
Patent Literature 2: Japanese Unexamined Patent Application Publication No. 2012-225563 (claim 1)
Patent Literature 3: Japanese Unexamined Utility Model Registration Application Publication No. 7-41327 (paragraph [0006])
Patent Literature 4: Japanese Unexamined Patent Application Publication No. 9-145095 (paragraph [0004])
Patent Literature 5: Japanese Unexamined Patent Application Publication No. 2007-10269 (claim 1)

SUMMARY OF INVENTION

Technical Problem

Regarding the outdoor unit described in Patent Literature 1, although the heat exchanger provided on the upper side is supported without the strength of the bottom plate that supports the heat exchanger being decreased, the flow rate of the air passing through the heat exchanger is decreased. Hence, the dew condensation water produced by the heat exchanger tends to freeze.

Regarding the outdoor unit described in Patent Literature 2, the drain ports are provided at, specifically, a position facing a middle position between the left and right ends of a long-side portion of the heat exchanger and at a position facing a front-side position of a short-side portion of the heat exchanger. Hence, the dew condensation water produced by the heat exchanger is discharged without accumulating on the bottom plate. However, due to the structure in which the plurality of drain ports are provided in the bottom plate, the strength of the bottom plate decreases, and the flow rate of the air passing through the heat exchanger decreases.

Furthermore, regarding the outdoor unit described in Patent Literature 3, although the number of drain holes is reduced by inclining the bottom plate, dew condensation water may accumulate on the bottom plate, depending on the angle of slope. Hence, there are risks that the dew condensation water accumulates between the bottom of the heat exchanger and the bottom plate, leading to corrosion of the heat-transfer tubes of the heat exchanger and that the dew condensation water accumulating between the bottom of the heat exchanger and the bottom plate freezes, leading to breakage of the heat-transfer tubes of the heat exchanger.

Furthermore, regarding the outdoor unit described in Patent Literature 4, although discharging of dew condensation water is facilitated by the louver-like cut-and-raised portions while avoiding decrease in strength of the bottom plate, because the overall opening area increases, the flow rate of the air passing through the heat exchanger is decreased.

Furthermore, regarding the outdoor unit described in Patent Literature 5, because the heat pipe is formed, the shape of the bottom plate is not changed. Hence, the strength of the bottom plate is not decreased, or the flow rate of the air passing through the heat exchanger is not decreased. However, the cost is high, and, in case of failure of the heater for the heat pipe, dew condensation water accumulates on the bottom plate.

In other words, there has been a problem that it is impossible to support the heat exchanger provided on the upper side without decreasing the strength of the bottom plate that supports the heat exchanger and without decreasing the flow rate of air passing through the heat exchanger, thereby reliably avoiding, at low cost, falling off of the heat exchanger provided on the upper side, even when vibration due to operation or vibration due to transportation occurs.

The present invention has been made to overcome the above-described problem, and an object thereof is to provide an outdoor unit that is capable of supporting the heat exchanger provided on the upper side without decreasing the strength of a bottom plate that supports the heat exchanger and without decreasing the flow rate of air passing through the heat exchanger, thereby reliably avoiding, at low cost, falling off of a heat exchanger provided on the upper side, even when vibration due to operation or vibration due to transportation occurs.

Solution to Problem

An outdoor unit for an air-conditioning-apparatus according to the present invention includes a lower heat exchanger that has a first heat-transfer tube; an upper heat exchanger that is provided on the lower heat exchanger, that includes a first heat-exchanger core and a second heat-exchanger core which is additionally provided in a column direction of the first heat-exchanger core, and that has a second heat-transfer tube; and a reinforcing member that supports the upper heat exchanger. The reinforcing member includes a first supporting tab that supports a bottom of the second heat-exchanger core; a second supporting tab that supports a lower side surface of the second heat-exchanger core and is formed integrally with the first supporting tab; a third supporting tab that provides a gap between the first heat-exchanger core and the second heat-exchanger core and is formed integrally with the first supporting tab; a first engaging tab that holds the first heat-transfer tube and is formed integrally with the third supporting tab; and a second engaging tab that holds the second heat-transfer tube and is formed integrally with the third supporting tab.

Advantageous Effects of Invention

According to the present invention, by supporting the bottom of the lowest heat-transfer tube of the heat exchanger provided on the upper side with a reinforcing member that forms an air passage, the heat exchanger provided on the upper side is supported, without the strength of the bottom plate that supports the heat exchanger being decreased and without the flow rate of air passing through the heat exchanger being decreased. Hence, the present invention has an advantage in that it is possible to reliably avoid, at low cost, falling off of the heat exchanger provided on the upper side, even when vibration due to operation or vibration due to transportation occurs.

DESCRIPTION OF EMBODIMENTS

An embodiment of the present invention will be described in detail below, using the drawings. Note that, in the drawings below, the dimensional relationships among components may be different from those in the actual configuration. Furthermore, in the drawings below, components denoted by the same reference numerals refer to the same or equivalent components throughout the specification. Moreover, the forms of the components described in this specification are merely examples and are not limited to these descriptions.

Embodiment 1

Figure 1:
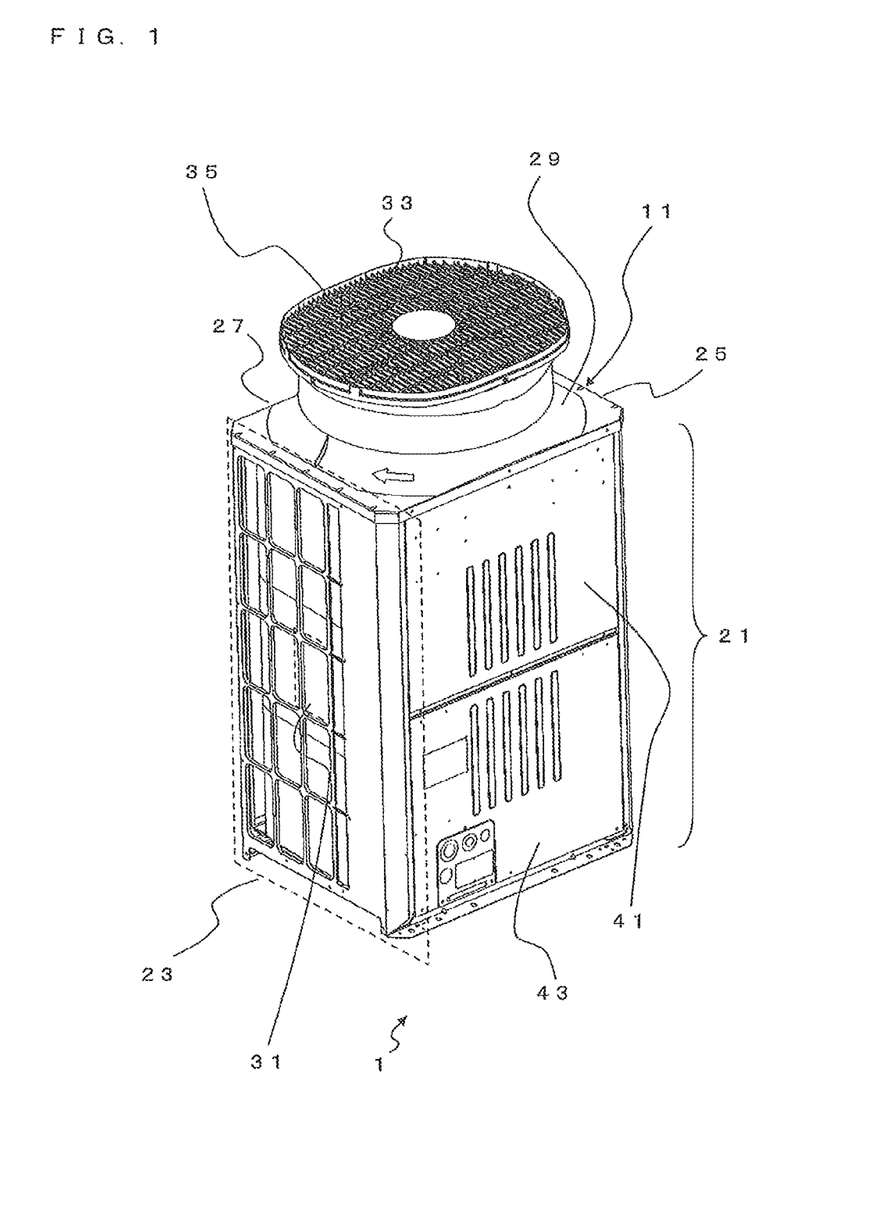
FIG. 1 is a perspective view of an outdoor unit for an air-conditioning-apparatus 1 according to Embodiment 1 of the present invention.

FIG. 1 is a perspective view of an outdoor unit for an air-conditioning-apparatus 1 according to Embodiment 1 of the present invention. As shown in FIG. 1, the outer surface side of the outdoor unit 1 is formed of a housing 11. The housing 11 is formed of a front panel 21, a first side panel 23, a second side panel 25, a rear panel 27, a top panel 29, etc.

The front panel 21 is formed of an upper front panel 41 and a lower front panel 43. The upper front panel 41 and the lower front panel 43 are opened and closed when an operator performs maintenance or the like on the inside of the housing 11. The first side panel 23, the second side panel 25, and the rear panel 27 each has air inlets 31. The top panel 29 has an air outlet 33. A fan 35 is provided inside the housing 11. When the fan 35 is driven, a negative pressure is generated inside the housing 11, drawing the air around the housing 11 from the respective air inlets 31 and blowing the drawn air from the air outlet 33. Note that, although an example of the housing 11 has been described in the above description, the configuration of the housing 11 is not limited thereto.

Figure 2:
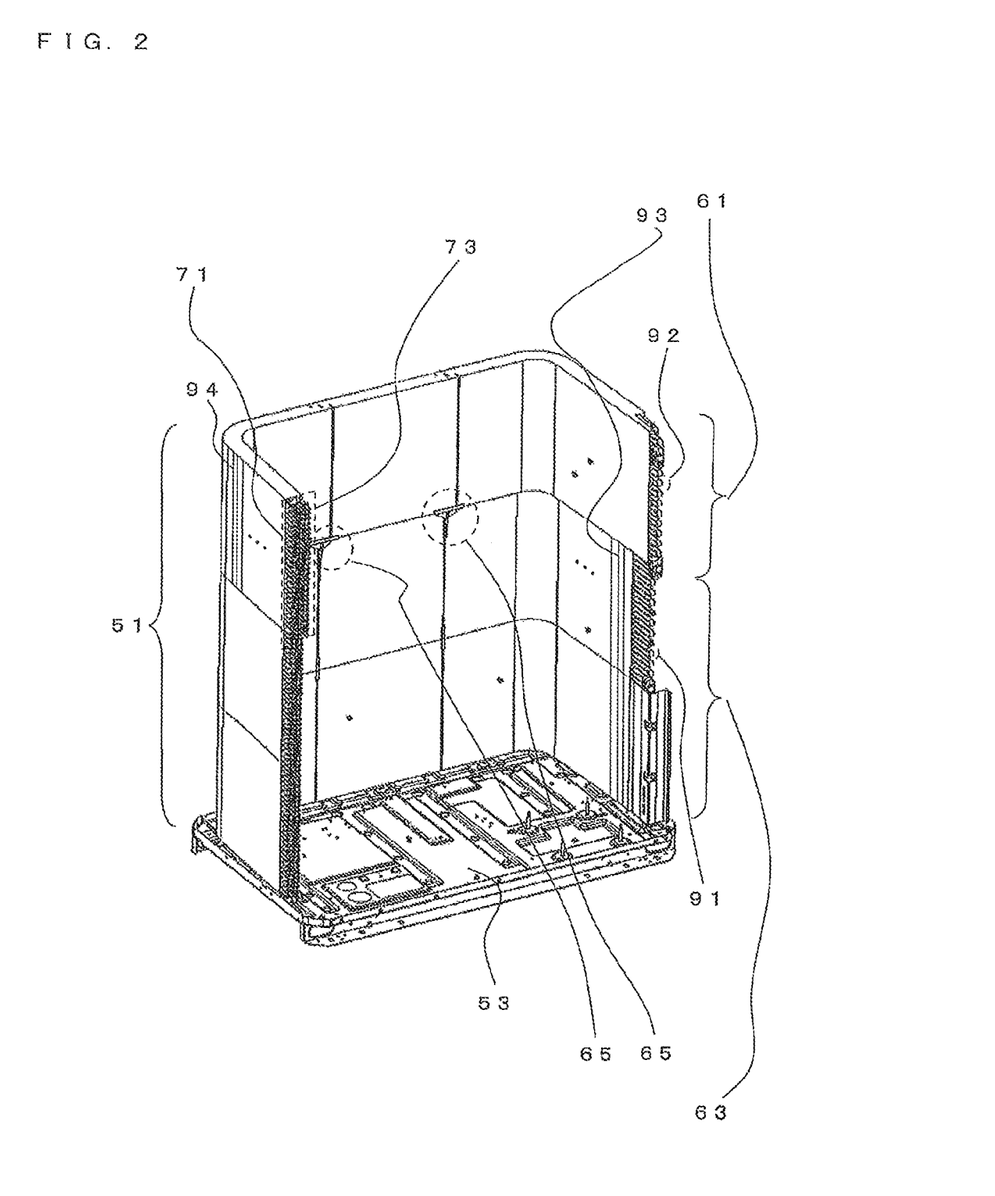
FIG. 2 is a perspective view of a heat exchanger 51 provided in the outdoor unit for an air-conditioning-apparatus 1 according to Embodiment 1 of the present invention.

FIG. 2 is a perspective view of a heat exchanger 51 provided in the outdoor unit for an air-conditioning-apparatus 1 according to Embodiment 1 of the present invention. As shown in FIG. 2, the heat exchanger 51 is mounted on a bottom plate 53. The heat exchanger 51 is formed of an upper heat exchanger 61 and a lower heat exchanger 63 and has a two-layer configuration, in which the upper heat exchanger 61 is provided on the lower heat exchanger 63. The lower heat exchanger 63 includes first heat-transfer tubes 91. The first heat-transfer tubes 91 are bent in a U shape, through which refrigerant circulates. Specifically, the lower heat exchanger 63 is formed such that radiating fins 93 are passed through the first heat-transfer tubes 91 that are arranged in rows.

The upper heat exchanger 61 includes a first-row heat-exchanger core 71 and a second-row heat-exchanger core 73. The second-row heat-exchanger core 73 is formed by increasing the number of rows of the first-row heat-exchanger core 71 toward the inside of the housing 11. The first-row heat-exchanger core 71 and the second-row heat-exchanger core 73 include second heat-transfer tubes 92. The second heat-transfer tubes 92 are bent in a U shape, through which refrigerant circulates. Specifically, the first-row heat-exchanger core 71 and the second-row heat-exchanger core 73 are formed such that radiating fins 94 are passed through the second heat-transfer tubes 92 that are arranged in rows.

Note that, in the description above, although an example in which the heat exchanger 51 has a two-layer configuration has been described, the configuration is not specifically limited thereto. The heat exchanger 51 may have a multi-layer configuration in which more than two layers are provided. Furthermore, although an example in which the first heat-transfer tubes 91 and the second heat-transfer tubes 92 are bent in a U shape has been described above, the configuration is not specifically limited thereto. The first heat-transfer tubes 91 and the second heat-transfer tubes 92 are only necessary to be accommodated in the housing 11.

Furthermore, although FIG. 2 shows an example in which the first-row heat-exchanger core 71 and the second-row heat-exchanger core 73 form the upper heat exchanger 61 that includes the second heat-transfer tubes 92 arranged in, for example, three rows and in which the lower heat exchanger 63 that includes the first heat-transfer tubes 91 arranged in two rows is formed, the arrangement structure is not specifically limited thereto.

Note that the first-row heat-exchanger core 71 corresponds to the first heat-exchanger core of the present invention. Furthermore, the second-row heat-exchanger core 73 corresponds to the second heat-exchanger core of the present invention.

Figure 3:
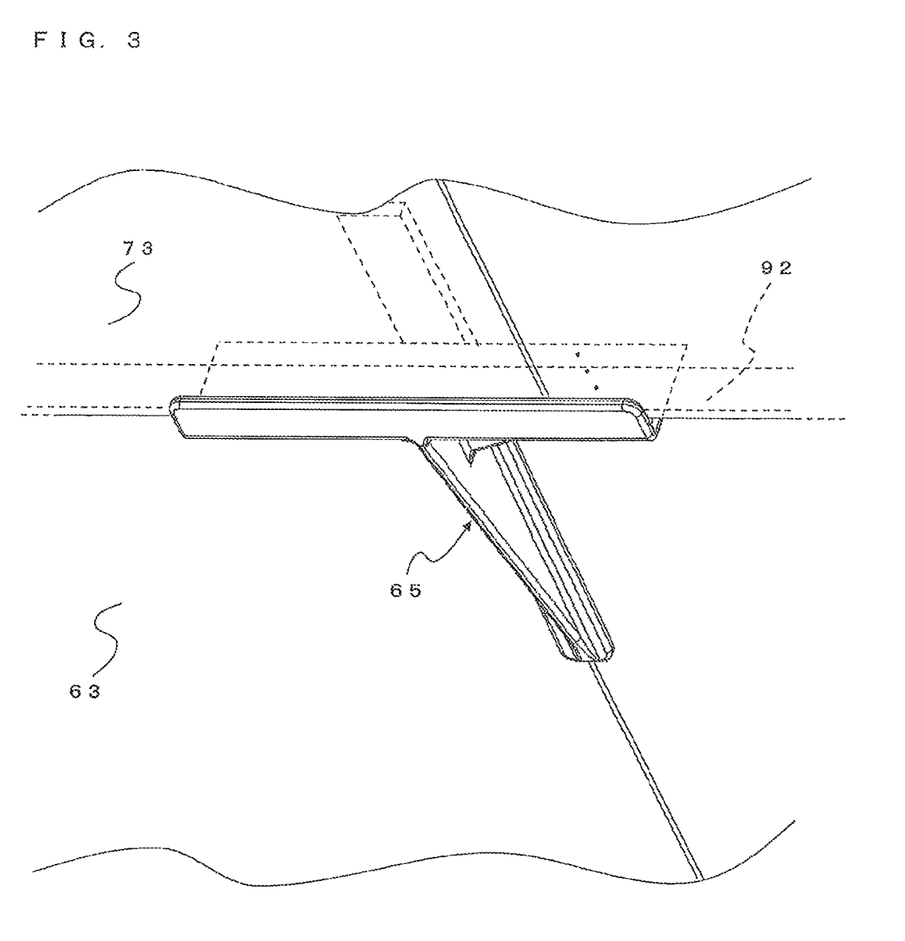
FIG. 3 is an enlarged perspective view of a reinforcing member 65, in a state in which it is attached to the heat exchanger 51 according to Embodiment 1 of the present invention.

A reinforcing member 65 is provided between the upper heat exchanger 61 and the lower heat exchanger 63. Although a plurality of reinforcing members 65 are provided in the example shown in FIG. 2, the configuration is not specifically limited thereto. FIG. 3 is an enlarged perspective view of the reinforcing member 65, in a state in which it is attached to the heat exchanger 51 according to Embodiment 1 of the present invention. The reinforcing member 65 supports the second-row heat-exchanger core 73. The reinforcing member 65 supports the second-row heat-exchanger core 73 at a surface thereof in contact with the second heat-transfer tube 92, for example. Note that, although FIG. 3 shows an example in which one row of the second heat-transfer tubes 92 is supported by the reinforcing member 65, the configuration is not limited thereto.

Figure 4:
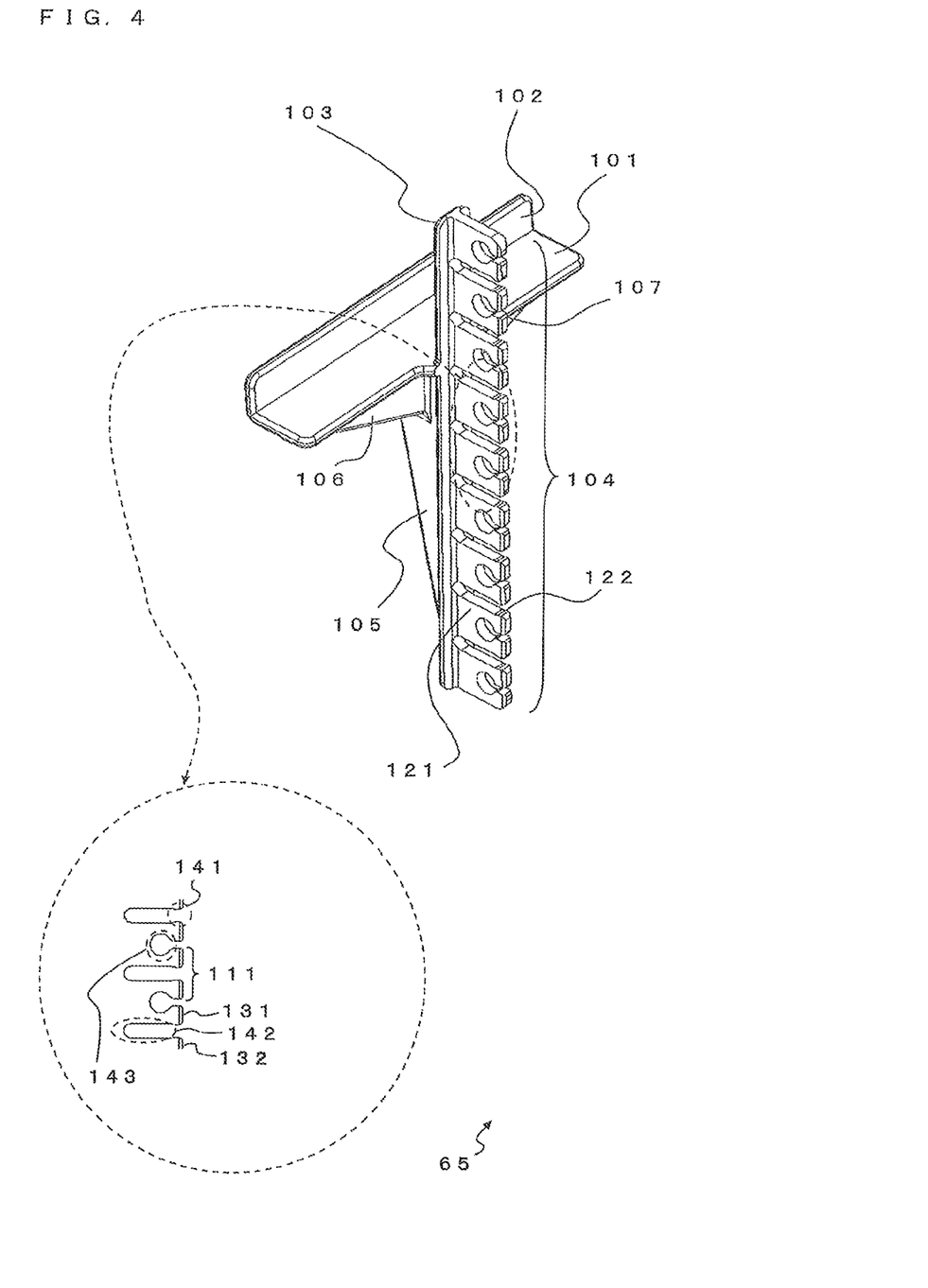
FIG. 4 is a perspective view of the reinforcing member 65 according to Embodiment 1 of the present invention, as viewed from the front side.

Next, a detailed structure of the reinforcing member 65 will be described, with reference to FIGS. 4 to 6. FIG. 4 is a perspective view of the reinforcing member 65 according to Embodiment 1 of the present invention, as viewed from the front side. As shown in FIG. 4, the reinforcing member 65 includes a first supporting tab 101, a second supporting tab 102, a third supporting tab 103, an engaging tab assembly 104, a first brace 105, a second brace 106, and a third brace 107, which are integrally formed of flexible resin.

The first supporting tab 101 supports the bottom of the second-row heat-exchanger core 73, and a direction parallel to the bottom of the second-row heat-exchanger core 73 corresponds to the longitudinal direction of the first supporting tab 101 itself. As has been described above, because the first supporting tab 101 supports the second-row heat-exchanger core 73 at the surface in contact with the second heat-transfer tube 92, the first supporting tab 101 is only necessary to have a width equivalent to the diameter of the second heat-transfer tube 92 and to have a strength capable of supporting the second heat-transfer tube 92.

The second supporting tab 102 supports the lower side surface of the second-row heat-exchanger core 73, and a direction parallel to the lower side surface of the second-row heat-exchanger core 73 corresponds to the longitudinal direction of the second supporting tab 102 itself. For example, the second supporting tab 102 is provided so as to stand substantially upright at an edge extending in the longitudinal direction of the first supporting tab 101. The third supporting tab 103 provides a gap 201 (described below) between the first-row heat-exchanger core 71 and the second-row heat-exchanger core 73, and a portion of the flat portion thereof faces the second supporting tab 102. A direction parallel to the radiating fins 94 corresponds to the longitudinal direction of the third supporting tab 103 itself.

The engaging tab assembly 104 includes a plurality of engaging tabs 111. The plurality of engaging tabs 111 are configured in, for example, a comb shape. The engaging tabs 111 are formed at predetermined intervals in the longitudinal direction of the third supporting tab 103, so as to correspond to the positions of the respective first heat-transfer tubes 91 and second heat-transfer tubes 92. The plurality of engaging tabs 111 each holds the first heat-transfer tube 91 or the second heat-transfer tube 92. Of the plurality of engaging tabs 111, some engaging tabs 111 serve to provide a gap 202 (described below) between the first-row heat-exchanger core 71 and the lower heat exchanger 63.

The engaging tabs 111 each include a first side surface 121, a second side surface 122, a first end 131, a second end 132, etc., and a rear side thereof is formed integrally with the third supporting tab 103. The engaging tab 111 is provided with a cutout portion that includes a heat-transfer-pipe inserting portion 141 through which the first heat-transfer tube 91 or the second heat-transfer tube 92 is inserted and a heat-transfer-pipe holding portion 142 that holds the first heat-transfer tube 91 or the second heat-transfer tube 92 inserted from the heat-transfer-pipe inserting portion 141. The heat-transfer-pipe inserting portion 141 is a space formed between the first end 131 and the second end 132. The heat-transfer-pipe holding portion 142 is a through-hole extending between the first side surface 121 and the second side surface 122.

The first heat-transfer tube 91 or the second heat-transfer tube 92 is inserted into the engaging tab 111 from the heat-transfer-pipe inserting portion 141, and the inserted first heat-transfer tube 91 or the second heat-transfer tube 92 is held by the heat-transfer-pipe holding portion 142. That is, the engaging tab 111 is configured to allow the first heat-transfer tube 91 or the second heat-transfer tube 92 to be inserted therein. Moreover, because a spring portion 143, which is a through-hole extending between the first side surface 121 and the second side surface 122, has elasticity, an operator can attach the reinforcing member 65 to the heat exchanger 51 without a tool. Furthermore, the strength of the engaging tab 111 is ensured by the first heat-transfer tube 91 or the second heat-transfer tube 92 being inserted therein. Furthermore, because the reinforcing member 65 including the engaging tabs 111 is formed of flexible resin, even if the first heat-transfer tubes 91 and the second heat-transfer tubes 92 have some dimensional variations, displacement due to the variation can be corrected, and hence, the range of tolerance is wide.

Note that, out of the engaging tabs 111, those that hold the first heat-transfer tubes 91 and are formed integrally with the third supporting tab 103 correspond to first engaging tabs of the present invention. Furthermore, out of the engaging tabs 111, those that hold the second heat-transfer tubes 92 and are formed integrally with the third supporting tab 103 correspond to second engaging tabs of the present invention. Furthermore, out of the heat-transfer-pipe inserting portions 141, those that allow the first heat-transfer tubes 91 to be inserted therein correspond to a first insertion portion of the present invention. Furthermore, out of the heat-transfer-pipe inserting portions 141, those that allow the second heat-transfer tubes 92 to be inserted therein correspond to a second insertion portion of the present invention. Furthermore, out of the heat-transfer-pipe holding portions 142, those that hold the first heat-transfer tubes 91 correspond to a first holding portion. Furthermore, out of the heat-transfer-pipe holding portions 142, those that hold the second heat-transfer tubes 92 correspond to a second holding portion.

Figure 5:
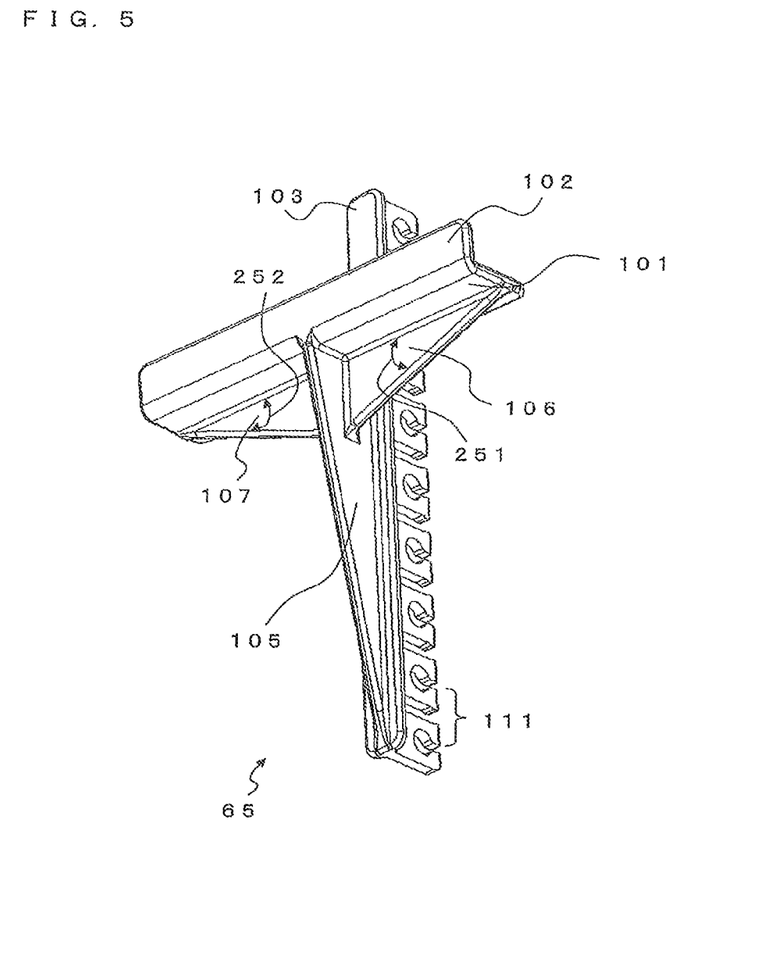
FIG. 5 is a perspective view of the reinforcing member 65 according to Embodiment 1 of the present invention, as viewed from the rear side.

FIG. 5 is a perspective view of the reinforcing member 65 according to Embodiment 1 of the present invention, as viewed from the rear side. As shown in FIG. 5, the first brace 105 has one edge that is integral with the first supporting tab 101 and another edge that is integral with the third supporting tab 103, and the first brace 105 supports the first supporting tab 101. The second brace 106 is integral with the first supporting tab 101 and the first brace 105. The third brace 107 is integral with the first supporting tab 101 and the first brace 105. The second brace 106 and the third brace 107 are formed at symmetrical positions with respect to the first brace 105 and support the first supporting tab 101.

An angle 251 of the second brace 106 is, for example, 20 degrees. The angle 251 is set to such a value that the first supporting tab 101 is supported, without passage of air 212, which will be described below with reference to FIG. 6, being blocked. An angle 252 of the third brace 107 is, for example, 20 degrees. The angle 252 is set to such a value that the first supporting tab 101 is supported, without passage of air 212, which will be described below with reference to FIG. 6, being blocked. Note that the value 20 degrees is merely an example and the value is not specifically limited thereto.

Note that, although an example in which the reinforcing member 65 is formed of flexible resin has been described in the above description, the configuration is not specifically limited thereto. For example, the reinforcing member 65 may be formed of a flexible insulating material. Furthermore, the reinforcing member 65 may be formed of thermoplastic resin that is softened by heat much higher than the heat generated by the heat exchanger 51. Furthermore, the reinforcing member 65 may be formed such that an inner part is formed of a conducting material and an outer surface thereof is coated with an insulating material.

For example, assuming that each of the first heat-transfer tube 91 and the second heat-transfer tube 92 is formed of aluminum or an alloy containing aluminum, when the reinforcing member 65 is an insulating member, as described above, the first heat-transfer tube 91, the second heat-transfer tube 92, and the reinforcing member 65 are not electrically connected via dew condensation water.

In other words, a portion of the reinforcing member 65 that comes into contact with the first heat-transfer tube 91 or the second heat-transfer tube 92 is formed of an insulating material other than metal, such as aluminum, as used for the first heat-transfer tube 91 or the second heat-transfer tube 92. Thus, even if dew condensation water accumulates between the first heat-transfer tube 91 or the second heat-transfer tube 92 and the reinforcing member 65, they are not electrically connected, and hence, it is possible to avoid corrosion due to contact between dissimilar metals.

Furthermore, the reinforcing member 65 may be formed by, for example, pouring molten material into a mold, pressing, or cutting, and the method of processing is not specifically limited.

Figure 6:
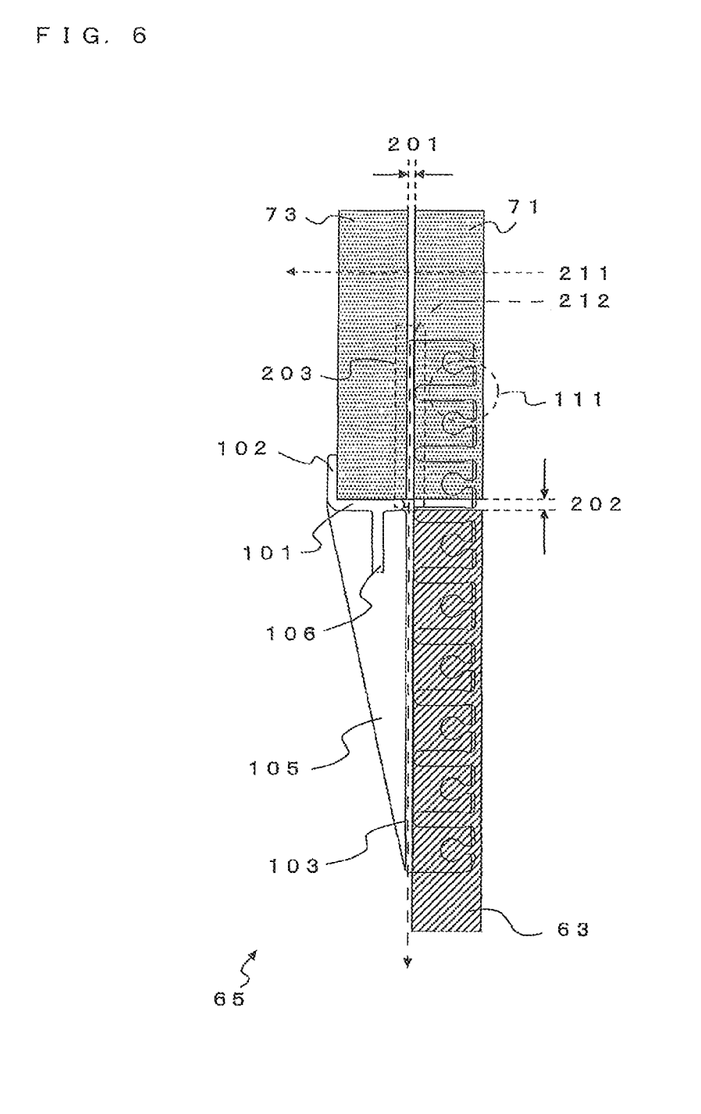
FIG. 6 is a sectional view of the reinforcing member 65, in a state in which it is attached to the heat exchanger 51 according to Embodiment 1 of the present invention, as viewed through a side surface thereof.

FIG. 6 is a sectional view of the reinforcing member 65, in a state in which it is attached to the heat exchanger 51 according to Embodiment 1 of the present invention, as viewed through a side surface thereof. As shown in FIG. 6, the third supporting tab 103 has a predetermined thickness so as to form an air passage 203, through which air 211 and air 212 from outside circulate, between the first-row heat-exchanger core 71 and the second-row heat-exchanger core 73. The third supporting tab 103 having a predetermined thickness provides the gap 201 between the first-row heat-exchanger core 71 and the second-row heat-exchanger core 73.

That is, the third supporting tab 103 has a predetermined thickness and is disposed between the first-row heat-exchanger core 71 and the second-row heat-exchanger core 73. Note that, the predetermined thickness does not need to be a certain fixed width, and it is only necessary that the gap 201 can be provided.

Furthermore, as has been described above, the respective plurality of engaging tabs 111 are formed in the longitudinal direction of the third supporting tab 103, at predetermined intervals corresponding to the positions of the respective first heat-transfer tubes 91 and second heat-transfer tubes 92, thereby providing the gap 202 between the first-row heat-exchanger core 71 and the lower heat exchanger 63. Hence, because the plurality of engaging tabs 111 can provide the gap 202 between the first-row heat-exchanger core 71 and the lower heat exchanger 63, interference between the first-row heat-exchanger core 71 and the lower heat exchanger 63 can be avoided.

In short, as shown in FIG. 6, the second-row heat-exchanger core 73 is disposed between the second supporting tab 102 and the third supporting tab 103. Furthermore, the position of the first-row heat-exchanger core 71 is set by the third supporting tab 103 and the plurality of engaging tabs 111.

Herein, assuming that the fan 35, described with reference to FIG. 1, is being driven, the air around the housing 11 is drawn from the air inlets 31, and, as shown in FIG. 6, the air 211 flows out of the first-row heat-exchanger core 71 into the second-row heat-exchanger core 73. Furthermore, at the same time, the air 212 passes through the air passage 203 and flows out along the lower heat exchanger 63. Hence, because the air 212 is generated while the fan 35 is being driven, the dew condensation water produced in the heat exchanger 51 is kept discharged through the use of the gap 201.

Accordingly, a situation in which dew condensation water freezes in a space surrounded by the reinforcing member 65, the radiating fin 93, and the radiating fin 94 is avoided. Furthermore, because the air 212 is produced in the air passage 203, a state in which dust or dirt accumulates in the gap 201 is prevented. As a result, because the reinforcing member 65 prevents frost formation by avoiding accumulation of dew condensation water in the heat exchanger 51, it is possible to prevent degradation in performance of the heat exchanger 51 and to prevent breakage of the first heat-transfer tubes 91 and the second heat-transfer tubes 92.

Furthermore, because the reinforcing member 65, which has a smaller size than the heat exchanger 51, serves the functions described above, it does not block the air 212 circulating through the upper heat exchanger 61 and the lower heat exchanger 63, it does not block the air 211 circulating through the first-row heat-exchanger core 71 and the second-row heat-exchanger core 73, and there is no need to provide a hole in the bottom plate 53 to discharge the dew condensation water. Hence, the strength of the bottom plate 53 that supports the heat exchanger 51 is not decreased, and the air 211 and the air 212 passing through the heat exchanger 51 are not reduced.

Furthermore, even if vibration due to operation of the outdoor unit 1 or vibration due to transport of the outdoor unit 1 occurs, because the reinforcing member 65 supports the upper heat exchanger 61 with the first supporting tab 101, the second supporting tab 102, the third supporting tab 103, and the engaging tab assembly 104, it is possible to reliably avoid, at low cost, a situation in which the upper heat exchanger 61 falls off the lower heat exchanger 63.

From the above description, by supporting the bottom of the lowest second heat-transfer tube 92 of the upper heat exchanger 61 provided on the upper side with the reinforcing member 65 that forms the air passage 203, the upper heat exchanger 61 provided on the upper side is supported, without the strength of the bottom plate 53 that supports the heat exchanger 51 being decreased and without the flow rate of the air 211 and the air 212 passing through the heat exchanger 51 being decreased.

Hence, even if vibration due to operation or vibration due to transportation occurs, the outdoor unit 1 can reliably avoid, at low cost, falling off of the upper heat exchanger 61, which is the heat exchanger 51 provided on the upper side.

Furthermore, because it is configured such that dew condensation water does not accumulate between the upper heat exchanger 61 and the reinforcing member 65, it is possible to prevent corrosion or breakage due to freezing of the first heat-transfer tubes 91 and the second heat-transfer tubes 92.

Furthermore, because the reinforcing member 65 is an insulating member, it is possible to prevent corrosion of the first heat-transfer tubes 91 and the second heat-transfer tubes 92 due to contact with a dissimilar metal.

Furthermore, because the reinforcing member 65 is a flexible member and includes the plurality of engaging tabs 111, the first supporting tab 101, the second supporting tab 102, and the third supporting tab 103, it can be easily attached to the heat exchanger 51 without the use of a tool.

In other words, because the reinforcing member 65 can easily protect the heat exchanger 51 at low cost, by attaching the reinforcing member 65 to the heat exchanger 51, the outdoor unit for an air-conditioning-apparatus 1 with a protected heat exchanger 51 can be easily obtained at low cost.

Next, a method of manufacturing the outdoor unit for an air-conditioning-apparatus 1 according to Embodiment 1 will be described. The method of manufacturing the outdoor unit for an air-conditioning-apparatus 1 includes at least following steps.

First, the upper heat exchanger 61 is provided on the lower heat exchanger 63. Next, the first supporting tab 101 is made to support the bottom of the second-row heat-exchanger core 73. Next, the second supporting tab 102 is made to support the lower side surface of the second-row heat-exchanger core 73. Next, the third supporting tab 103 is made to provide the gap 201 between the first-row heat-exchanger core 71 and the second-row heat-exchanger core 73. Next, the engaging tabs 111 are made to hold the first heat-transfer tubes 91. Next, the engaging tabs 111 are made to hold the second heat-transfer tubes 92.

As a result of the above, the reinforcing member 65 functions as a member for supporting the upper heat exchanger 61. Hence, it is possible to reliably avoid, at low cost, falling off of the upper heat exchanger 61.

As has been described above, in Embodiment 1, the outdoor unit 1 including the lower heat exchanger 63 that has the first heat-transfer tubes 91; the upper heat exchanger 61 that is provided on the lower heat exchanger 63, that includes the first-row heat-exchanger core 71 and the second-row heat-exchanger core 73 which is additionally provided in the column direction of the first-row heat-exchanger core 71, and that has the second heat-transfer tubes 92; and the reinforcing member 65 that supports the upper heat exchanger 61 is formed. The reinforcing member 65 includes the first supporting tab 101 that supports the bottom of the second-row heat-exchanger core 73, the second supporting tab 102 that supports the lower side surface of the second-row heat-exchanger core 73 and is formed integrally with the first supporting tab 101, the third supporting tab 103 that provides the gap 201 between the first-row heat-exchanger core 71 and the second-row heat-exchanger core 73 and is formed integrally with the first supporting tab 101, the engaging tabs 111 that hold the first heat-transfer tubes 91 and are formed integrally with the third supporting tab 103, and the engaging tabs 111 that hold the second heat-transfer tubes 92 and are formed integrally with the third supporting tab 103.

With the above-described configuration, by supporting the bottom of the lowest second heat-transfer tube 92 of the upper heat exchanger 61 provided on the upper side with the reinforcing member 65 that forms the air passage 203, the upper heat exchanger 61 provided on the upper side is supported, without the strength of the bottom plate 53 that supports the heat exchanger 51 being decreased and without the flow rate of the air 211 and the air 212 passing through the heat exchanger 51 being decreased. Hence, according to the present invention, falling off of the upper heat exchanger 61 provided on the upper side can be reliably avoided at low cost, even if vibration due to operation or vibration due to transport occurs.

Furthermore, in Embodiment 1, the second-row heat-exchanger core 73 is disposed between the second supporting tab 102 and the third supporting tab 103, the third supporting tab 103 and the engaging tabs 111 set the position of the first-row heat-exchanger core 71, and the third supporting tab 103 having a predetermined thickness is disposed between the first-row heat-exchanger core 71 and the second-row heat-exchanger core 73.

Furthermore, in Embodiment 1, the reinforcing member 65 is formed of flexible resin; the engaging tabs 111 are formed in the longitudinal direction of the third supporting tab 103, at predetermined intervals corresponding to the positions of the first heat-transfer tubes 91, and that have cutout portions including the heat-transfer-pipe inserting portion 141 from which the first heat-transfer tubes 91 are inserted and the heat-transfer-pipe holding portions 142 which hold the first heat-transfer tubes 91 inserted from the heat-transfer-pipe inserting portions 141; the plurality of engaging tabs 111 are formed in the longitudinal direction of the third supporting tab 103, at predetermined intervals corresponding to the positions of the second heat-transfer tubes 92, and that have the heat-transfer-pipe inserting portions 141 from which the second heat-transfer tubes 92 are inserted and the heat-transfer-pipe holding portions 142 which hold the second heat-transfer tubes 92 inserted from the heat-transfer-pipe inserting portions 141; and the engaging tabs 111 provide the gap 202 between the first-row heat-exchanger core 71 and the lower heat exchanger 63.

Furthermore, in Embodiment 1, each of the first heat-transfer tubes 91 and the second heat-transfer tubes 92 is formed of aluminum or an alloy containing aluminum.

Accordingly, even when vibration due to operation or vibration due to transportation occurs, the outdoor unit 1 can particularly remarkably avoid, reliably and at low cost, falling off of the upper heat exchanger 61 provided on the upper side.

Furthermore, in Embodiment 1, the method of manufacturing the outdoor unit for an air-conditioning-apparatus 1 is the method of manufacturing the outdoor unit for an air-conditioning-apparatus 1 including the lower heat exchanger 63 that has the first heat-transfer tubes 91; the upper heat exchanger 61 that includes the first-row heat-exchanger core 71 and the second-row heat-exchanger core 73 which is additionally provided in the column direction of the first-row heat-exchanger core 71, and has the second heat-transfer tubes 92; and the reinforcing member 65 that supports the upper heat exchanger 61, the reinforcing member 65 including the first supporting tab 101, the second supporting tab 102 that is integrally formed with the first supporting tab 101, the third supporting tab 103 that is formed integrally with the first supporting tab 101, the engaging tabs 111 that are formed integrally with the third supporting tab 103, and the engaging tabs 111 that are formed integrally with the third supporting tab 103, the method including a step of providing the upper heat exchanger 61 on the lower heat exchanger 63; a step of making the first supporting tab 101 support the bottom of the second-row heat-exchanger core 73; a step of making the second supporting tab 102 support the lower side surface of the second-row heat-exchanger core 73; a step of making the third supporting tab 103 provide the gap 201 between the first-row heat-exchanger core 71 and the second-row heat-exchanger core 73; a step of making the engaging tabs 111 hold the first heat-transfer tubes 91; and a step of making the engaging tabs 111 hold the second heat-transfer tubes 92.

Accordingly, the reinforcing member 65 functions as a member for supporting the upper heat exchanger 61. Hence, it is possible to reliably avoid, at low cost, falling off of the upper heat exchanger 61.

REFERENCE SIGNS LIST 1 outdoor unit, 11 housing, 21 front panel, 23 first side panel, 25 second side panel, 27 rear panel, 29 top panel, 31 air inlet, 33 air outlet, 35 fan, 41 upper front panel, 43 lower front panel, 51 heat exchanger, 53 bottom plate, 61 upper heat exchanger, 63 lower heat exchanger, 65 reinforcing member, 71 first-row heat-exchanger core, 73 second-row heat-exchanger core, 91 first heat-transfer tube, 92 second heat-transfer tube, 93, 94 radiating fin, 101 first supporting tab, 102 second supporting tab, 103 third supporting tab, 104 engaging tab assembly, 105 first brace, 106 second brace, 107 third brace, 111 engaging tab, 121 first side surface, 122 second side surface, 131 first end, 132 second end, 141 heat-transfer-pipe inserting portion, 142 heat-transfer-pipe holding portion, 201, 202 gap, 203 air passage, 211, 212 air, 251, 252 angle.

The invention claimed is:

1. An outdoor unit for an air-conditioning-apparatus comprising:
   a lower heat exchanger including a plurality of first heat transfer tubes;
   an upper heat exchanger provided above the lower heat exchanger, the upper heat exchanger including a first heat-exchanger core and a second heat-exchanger core provided in a column direction of the first heat-exchanger core, the upper heat exchanger having a plurality of second heat transfer tubes; and
   a reinforcing member supporting the upper heat exchanger,
   the reinforcing member including:
      a first supporting tab supporting a bottom of the second heat-exchanger core;
      a second supporting tab supporting a lower side surface of the second heat-exchanger core, the second supporting tab formed integrally with the first supporting tab;
      a third supporting tab providing a gap between the first heat-exchanger core and the second heat-exchanger core, the third supporting tab extending in a vertical direction and being formed integrally with, and orthogonal to, the first supporting tab;
      a plurality of first engaging tabs each holding a respective one of the first heat-transfer tubes, the plurality of first engaging tabs formed integrally with, and formed along a longitudinal direction of, the third supporting tab; and
      a plurality of second engaging tabs each holding a respective one of the second heat-transfer tubes, the plurality of second engaging tabs formed integrally with, and formed along the longitudinal direction of, the third supporting tab.

2. The outdoor unit of claim 1, wherein
the second heat-exchanger core is disposed between the second supporting tab and the third supporting tab,
the first heat-exchanger core is positioned by the third supporting tab, the first engaging tab, and the second engaging tab, and
the third supporting tab has a predetermined thickness and is disposed between the first heat-exchanger core and the second heat-exchanger core.

3. The outdoor unit of claim 1, wherein
the reinforcing member is formed of flexible resin,
the plurality of first engaging tabs are formed at predetermined intervals corresponding to positions of the first heat-transfer tubes, the first engaging tabs each having a cutout portion including a first insertion portion in which a respective one of the first heat-transfer tubes is inserted and a first holding portion holding a respective one of the first heat-transfer tubes inserted via the first insertion portion,
the plurality of second engaging tabs are formed at predetermined intervals corresponding to positions of the second heat-transfer tubes, the second engaging tabs each having a cutout portion including a second insertion portion in which a respective one of the second heat-transfer tubes is inserted and a second holding portion holding a respective one of the second heat-transfer tubes inserted via the second insertion portion, and
the first engaging tabs and the second engaging tabs provide a gap between the first heat-exchanger core and the lower heat exchanger.

4. The outdoor unit of claim 1, wherein each of the first heat-transfer tubes and the second heat-transfer tubes are formed of aluminum or an alloy containing aluminum.

5. The outdoor unit of claim 1, wherein
the first supporting tab includes a first planar surface,
the second supporting tab includes a second planar surface, and
the third supporting tab includes a third planar surface.

6. The outdoor unit of claim 1, wherein
the plurality of first engaging tabs are each shaped to surround and hold a respective one of the first heat-transfer tubes,
the plurality of second engaging tabs are each shaped to surround and hold a respective one of the second heat-transfer tubes, and
the plurality of first engaging tabs and the plurality of second engaging tabs are formed along an entire longitudinal direction of the third planar surface providing the gap of the third supporting tab.

7. A method of manufacturing an outdoor unit for an air-conditioning-apparatus, comprising:
providing a lower heat exchanger that has a plurality of first heat transfer tubes; an upper heat exchanger that includes a first heat-exchanger core and a second heat-exchanger core which is additionally provided in a column direction of the first heat-exchanger core, and has a plurality of second heat transfer tubes; and a reinforcing member that supports the upper heat exchanger, the reinforcing member including a first supporting tab, a second supporting tab that is formed integrally with the first supporting tab, a third supporting tab that extends in a vertical direction of, that is formed integrally with, and that extends orthogonal to the first supporting tab, a plurality of first engaging tabs that is formed integrally with, and arranged in a longitudinal direction of, the third supporting tab, and a plurality of second engaging tabs that is formed integrally with, and arranged in the longitudinal direction of, the third supporting tab;
providing the upper heat exchanger above the lower heat exchanger;
supporting, via the first supporting tab, a bottom of the second heat-exchanger core;
supporting, via the second supporting tab, a lower side surface of the second heat-exchanger core;
inserting the third supporting tab between the first heat-exchanger core and the second heat-exchanger core to provide a gap between the first heat-exchanger core and the second heat-exchanger core;
holding, via the plurality of first engaging tabs, the first heat-transfer tubes; and
holding, via the plurality of second engaging tabs, the second heat-transfer tubes.

8. The method of claim 7, wherein
the first supporting tab includes a first planar surface,
the second supporting tab includes a second planar surface, and
the third supporting tab includes a third planar surface.

9. The method of claim 7, wherein
the plurality of first engaging tabs are each shaped to surround and hold a respective one of the first heat-transfer tubes,
the plurality of second engaging tabs are each shaped to surround and hold a respective one of the second heat-transfer tubes, and
the plurality of first engaging tabs and the plurality of second engaging tabs are formed along an entire longitudinal direction of the third planar surface providing the gap of the third supporting tab.

* * * * *